United States Patent [19]

McFarlane et al.

[11] 4,432,332

[45] Feb. 21, 1984

[54] FUEL ECONOMIZER DEVICES

[75] Inventors: John McFarlane, Johnstone; Andrew Guy, Linwood, both of England

[73] Assignee: Sonell Products Limited, Thetford, United Kingdom

[21] Appl. No.: 284,228

[22] Filed: Jul. 17, 1981

[51] Int. Cl.³ .......................................... F02M 23/08
[52] U.S. Cl. .................................................. 123/587
[58] Field of Search ............................... 123/585–589; 137/480; 261/63, DIG. 1; 48/180 A

[56] References Cited

U.S. PATENT DOCUMENTS

| | | | |
|---|---|---|---|
| 1,474,450 | 11/1923 | Stransky | 123/585 X |
| 2,107,832 | 2/1938 | Neilson | 137/480 |
| 2,139,801 | 12/1938 | Boyce | 137/480 |
| 3,825,031 | 7/1974 | Doffi, Sr. | 137/480 |

*Primary Examiner*—William A. Cuchlinski, Jr.

[57] ABSTRACT

There is described a method of and a fuel economizer device for reducing the fuel comsumption of an internal combustion engine. The device is in the form of a body having an outlet to the engine and a pair of inlets for admission of additional air. The inlets are controlled by pressure operated valves.

1 Claim, 6 Drawing Figures

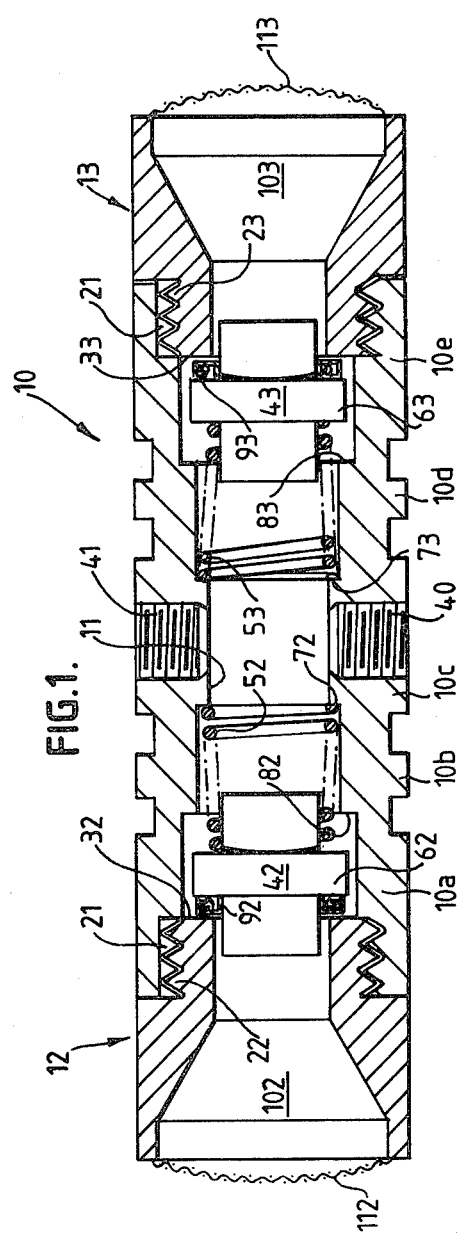
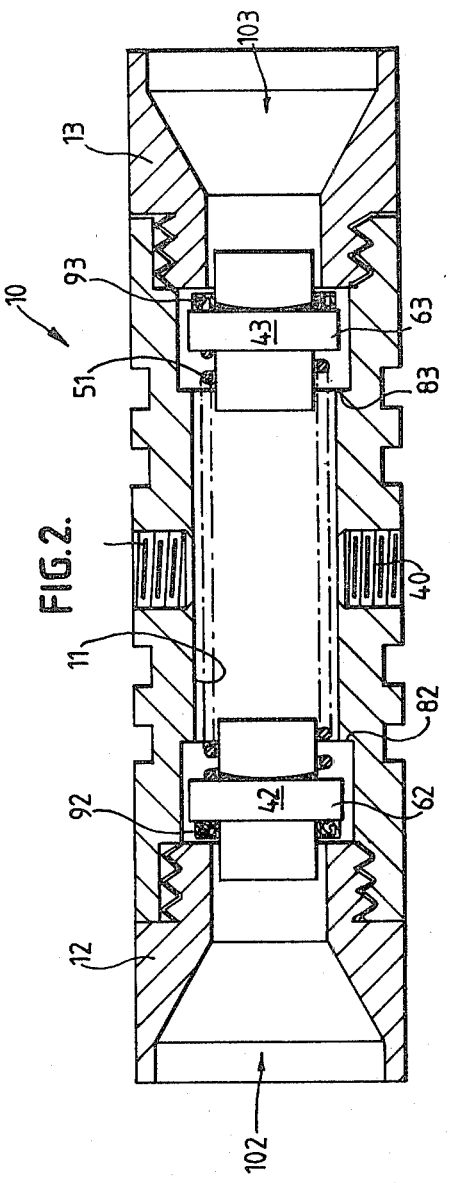
FIG.1.
FIG.2.

FUEL ECONOMIZER DEVICES

BACKGROUND OF THE INVENTION

The present invention relates to a method of reducing the fuel consumption of internal combustion engines and to an economiser device for such engines.

With the cost of fuel for combustion engines of all types increasing, there is a great demand for means by which the wastage of fuels may be kept to a minimum. Users of fuel are at the same time unwilling to accept sacrifices in the performance of their engines. It is known that engines consume fuel not only when they are providing positive output, but also at other times. It is an aim of the present invention to reduce the consumption of fuel when an engine is running but not producing positive work.

In U.K. Pat. No. 1,519,584 there is described a method of reducing the fuel consumption of an internal combustion engine comprising sensing the pressure difference between a source of air and the intake pressure of the fuel-air mixture to the engine, and introducing into the mixture additional air through a pressure-operated relief valve which opens when said pressure difference is in the range from 18 to 22 inches of mercury. This Specification also describes a fuel economiser device for use in combustion engines having an inlet for a combustible mixture, which device comprises a pressure-operated relief valve for communicating the said inlet to a source of air and means for sealably securing the downstream side of the valve to said inlet, the valve being arranged to open when the pressure difference between the upstream side and the downstream side rises to a point within the range from 18 to less than 22 inches of mercury, whereby the fuel-air mixture is weakened upon operation of the device by the entry of air through the valve.

SUMMARY OF THE INVENTION

It is an object of the present invention to provide an improvement on the method and device described in the above-mentioned earlier Specification.

According to the present invention there is provided a method of reducing the fuel consumption of an internal combustion engine comprising selectively weakening the fuel-air mixture to the engine in response to the intake pressure of the mixture, wherein said weakening is effected by introducing into the mixture additional air through more than one pressure operated valve.

Further according to the present invention there is provided a fuel economiser device for use in combustion engines comprising a main body, an outlet in said body for communication with an inlet to said engine for a combustible mixture, at least two inlets in said body, each inlet in the body being provided with a pressure operated valve whereby air may pass from the inlets in the body to the outlet in the body thus to weaken the combustible mixture being supplied to the engine.

DESCRIPTION OF THE DRAWINGS

Embodiments of the present invention will now be described by way of example, with reference to the accompanying drawings, in which:

FIG. 1 is a sectional view of one embodiment of a fuel economiser device made in accordance with the present invention;

FIG. 2 is a sectional view of a second embodiment of a fuel economiser device made in accordance with the present invention;

DESCRIPTION OF PREFERRED EMBODIMENTS

Figure 6:
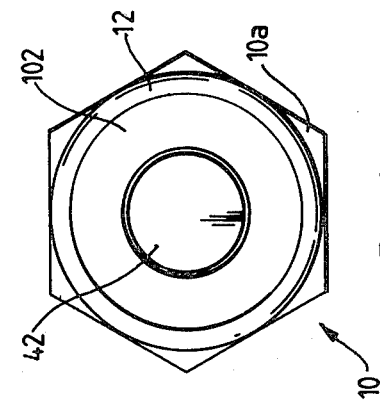
FIG. 6 is an end view of the device.

Referring to FIG. 1 of the drawings, one embodiment of the device of the invention comprises a cylindrical main body 10 having a through bore 11 and provided with hexagonal outer sections 10a to 10e.

Valve means 12 and 13 screw into respective ends of the bore 11 by means of threaded portions 22 and 23 engaging respective threaded portions 21 of the bore 11. The valve means 12, 13 each have a valve seat 32, 33 against which there is urged respective valve members 42, 43 by respective springs 52, 53 acting between shoulders 62, 63 on the valve members 42, 43 and stepped portions 72, 73 in the bore 11.

Further stepped portions 82, 83 limit movement of the valve member 42, 43 in the direction of compression of the springs 52, 53 and seals 92, 93 are provided to ensure sealing contact of the valve members 42, 43 against the valve seats 32, 33.

The valve means 12, 13 are provided with tapered inlets 102, 103 for admitting additional air to the engine. The inlets 102, 103 may be protected by filter means such as a gauze 112, 113 or the like.

In the embodiment of FIG. 2, the bore 11 is not provided with stepped portions 72, 73 and a single counterbalance spring 51 has one end acting on shoulder 62 of valve member 42 whilst its other end acts on shoulder 53 of valve member 43.

The valve means 12, 13 need not, of course, take on the form particularly described. The valve members 42, 43 may be replaced by a tapered plunger and the valve seat 32, 33 could also be tapered or bevelled. A disc, normally resting on an annular edge or surface might also be used. In certain circumstances the use of a ball as the valve element as described in U.K. Pat. 1,519,584 might be advantageous.

Figure 4:
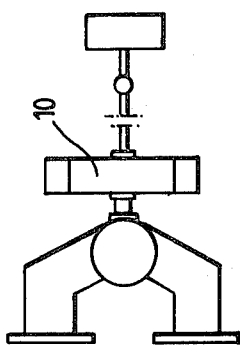
FIGS. 3 and 4 are schematic views illustrating the device fitted to an inlet manifold of an internal combustion engine.
Figure 3:
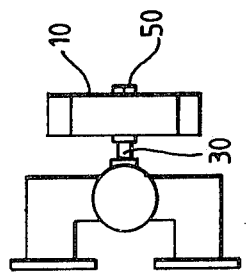
Figure 5:
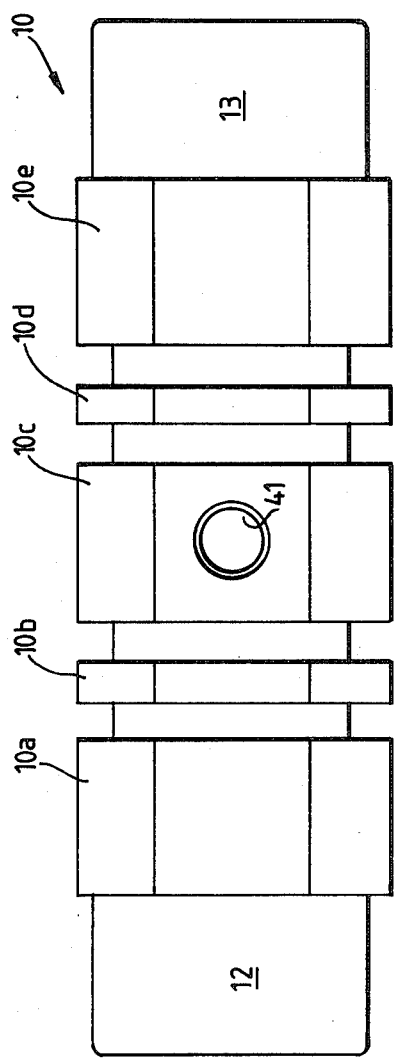
FIG. 5 is a top view of the device.

When mounting the device to the inlet manifold of an engine, the body 10 can most simply be first secured thereto, ensuring that the pressure in the manifold is afforded clear access to the downstream side of the valve means 12, 13. As shown in FIG. 3, the securement is preferably effected by a connector piece 30 which fits in a radial screwed threaded opening 40 in the central hexagonal portion 10c of the body 10 and in a hole tapped in the inlet manifold of the engine. Many manifolds are presently already provided with a suitable hole, although a carburetor body may alternatively provide the requisite support. A diametrically opposite screw threaded opening 41 may be blocked off by a blanking plug 50. In road vehicles with vacuum servo-assisted brakes the device of the invention may be connected to the vacuum pipe from the manifold to the servo unit as illustrated in FIG. 4. Similarly, in vehicles fitted with multiple carburetors, the device or devices may be fitted to the balance pipe or pipes.

It will be understood that the device may also be mounted to the body of a car with a lead tube from the inlet manifold. This can be useful expedient on modern compact engines and further facilitate repair or replacement either of the device or engine. It is important that the device is mounted horizontally.

The device is calibrated by appropriate selection of springs 52, 52 or spring 51 and by adjusting the extent to which the valve means 12, 13 is screwed into the body 11.

We have found that an operating pressure difference across the valve of 18-22 inches of mercury is suitable on, for example, cars with medium size engines, 20 inches being preferred. Different engines having different operating characteristics and to be used in different environments will require different spring settings to provide maximum economy. For this reason it is desirable that the relative orientation of the body 11 and valve means 12, 13 be calibrated. This also simplifies the application of a device according to the invention to an engine without specialist equipment or attention.

In normal use of a car using a liquid fuel, the engine draws fuel which is not used in at least two situations; overrun and idling. When for example, driving downhill or decelerating in gear, the engine is creating a vacuum in the inlet manifold, but not using the fuel which is drawn in. Also, when idling, the manifold pressure calls for more fuel than is required. Under these conditions, the valve in the present device opens and the incoming air weakens the mixture by replacing a proportion of the mixture drawn through the carburetor by air, thereby reducing the total amount of fuel used.

The device of the present invention, by providing a double ended device with two valve means, results in an increased area being presented to atmosphere thus breaking the excess vacuum more quickly and reducing by about 40% the high vacuum produced on most engines.

The configuration of the valve members 42, 43 and their rubber seals 92, 93 ensures an efficient air seal under low vacuum running conditions. Further the provision of the stepped portions 82, 83 will allow the device to seal failsafe in the event of failure of the springs 52, 53 or of the spring 51.

We claim:

1. A fuel economiser device for use in combustion engines comprising a main body, a circular bore in said body extending axially thereof, an outlet in said body for communication with an inlet to said engine for a combustible mixture said outlet being in the form of a radial aperture in said body, each end of said bore defining a respective one of two inlets in said body, a pressure operated valve associated with each inlet in the body, each valve having an adjustable valve seat against which a valve member is urged by means of a spring whereby, on occurrence of a predetermined vacuum level in said engine inlet, air may pass from the said inlets in the body to said outlet in the body thus to weaken the combustible mixture being supplied to the engine, wherein the valve members of the valves are urged against their respective seats by means of a single counter-balance spring.

* * * * *